United States Patent
O'Connor et al.

(10) Patent No.: US 10,101,990 B2
(45) Date of Patent: Oct. 16, 2018

(54) SOFTWARE UPDATE SYSTEM, FIRMWARE OVER THE AIR UPDATING SYSTEM AND METHOD OF UPDATING A CLIENT DEVICE

(71) Applicant: u-blox AG, Thalwil (CH)

(72) Inventors: David O'Connor, San Diego, CA (US); Robert Yamaguchi, San Diego, CA (US); Zeeshan Mahmood, San Diego, CA (US); Janell Paulson, San Diego, CA (US); Sabih Zafar Ullah, San Diego, CA (US)

(73) Assignee: u-blox AG, Thalwil (CH)

( * ) Notice: Subject to any disclaimer, the term of this patent is extended or adjusted under 35 U.S.C. 154(b) by 34 days.

(21) Appl. No.: 15/475,027

(22) Filed: Mar. 30, 2017

(65) Prior Publication Data

US 2018/0074808 A1    Mar. 15, 2018

(30) Foreign Application Priority Data

Sep. 14, 2016    (WO) ................. PCT/EP2016/071647

(51) Int. Cl.
*G06F 9/44* (2018.01)
*G06F 8/65* (2018.01)
(Continued)

(52) U.S. Cl.
CPC ............ *G06F 8/65* (2013.01); *G06F 11/1433* (2013.01); *H04L 67/34* (2013.01); *G06F 2201/84* (2013.01); *H04L 67/42* (2013.01)

(58) Field of Classification Search
None
See application file for complete search history.

(56) References Cited

U.S. PATENT DOCUMENTS 7,062,765 B1 *   6/2006   Pitzel ...................... G06F 8/61
                                                      709/201
7,516,367 B1 *   4/2009   Beltowski ................ G06F 8/62
                                                      714/38.1
(Continued)

*Primary Examiner* — Insun Kang
(74) *Attorney, Agent, or Firm* — Westberg Law Offices

(57) ABSTRACT

A software update system comprises: a client device (104) having non-OS system software (110) to be updated, a client updating server (102) located remotely from the client device (104) and capable of communicating with the client device (104), and a device capability manager (126) accessing capability data relating to the client device (104). The updating server (102) retrieves a first update required to update at least part of the software (110). The updating server (102) comprises an update optimizer (124) that cooperates with the device capability manager (126) to determine an organizational scheme to apply to the first update to optimize updating of the client device. The organizational scheme is compatible with a technical capability of the client device (104), and the update optimizer (124) identifies a recovery function to recover the first update from an instance of the first update organized in accordance with the selected organizational scheme. The device capability manager (126) uses the capability data to determine necessary functionality required to implement the recovery function identified. The updating server (102) comprises an update package generator (116) responsive to the update optimizer (124) to generate an update package comprising a second update to enable the client device (104) to support the recovery function.

40 Claims, 8 Drawing Sheets

(51) Int. Cl.
  *H04L 29/08* (2006.01)
  *G06F 11/14* (2006.01)
  *H04L 29/06* (2006.01)

(56) References Cited

U.S. PATENT DOCUMENTS

| | | | | |
|---|---|---|---|---|
| 7,810,088 B2* | 10/2010 | Herle | ................ | G06F 8/65 714/15 |
| 8,555,273 B1* | 10/2013 | Chia | ................ | G06F 8/654 717/173 |
| 8,572,599 B2* | 10/2013 | Thaper | ................ | G06F 8/64 717/168 |
| 2008/0216066 A1* | 9/2008 | Oh | ................ | G06F 8/658 717/173 |
| 2009/0319848 A1* | 12/2009 | Thaper | ................ | G06F 8/64 714/748 |
| 2010/0169875 A1* | 7/2010 | Stewart | ................ | G06F 8/658 717/170 |
| 2010/0333081 A1* | 12/2010 | Etchegoyen | ................ | G06F 8/60 717/172 |
| 2011/0296398 A1* | 12/2011 | Vidal | ................ | G06F 8/65 717/171 |
| 2013/0055155 A1* | 2/2013 | Wong | ................ | G06F 8/65 715/810 |
| 2013/0254755 A1* | 9/2013 | Yousouf | ................ | G06F 8/60 717/170 |
| 2014/0317614 A1* | 10/2014 | Djabarov | ................ | G06F 8/654 717/173 |
| 2014/0366012 A1* | 12/2014 | Jamadagni | ................ | H04W 8/245 717/171 |
| 2015/0100955 A1* | 4/2015 | Chen | ................ | G06F 8/65 717/170 |
| 2015/0261645 A1* | 9/2015 | Tan | ................ | G06F 8/68 717/173 |
| 2015/0277897 A1* | 10/2015 | Deng | ................ | G06F 8/654 717/169 |
| 2016/0306977 A1* | 10/2016 | Zarakas | ................ | G06F 8/654 |
| 2017/0206079 A1* | 7/2017 | Zhang | ................ | G06F 8/68 |
| 2017/0222815 A1* | 8/2017 | Meriac | ................ | H04L 9/3247 |
| 2017/0364348 A1* | 12/2017 | Klitenik | ................ | G06F 8/654 |
| 2018/0081672 A1* | 3/2018 | Hilliar | ................ | G06F 8/65 |

* cited by examiner

SOFTWARE UPDATE SYSTEM, FIRMWARE OVER THE AIR UPDATING SYSTEM AND METHOD OF UPDATING A CLIENT DEVICE

FIELD OF THE INVENTION

The present invention relates to a software update system of the type that, for example, comprises a client updating server capable of communicating a non-Operating System (OS) update to a client device. The present invention also relates to a firmware over the air updating system of the type that, for example, comprises client updating server capable of communicating a non-OS update to a client device. The present invention further relates to a method of updating a client device the method being of the type that, for example, comprises a client update server communicating a non-OS update to a client device.

BACKGROUND OF THE INVENTION

In the field of wireless communications, for some applications, it is known to provide a so-called Firmware Over-The-Air (FOTA) system. FOTA systems are used for keeping communications-enabled devices in an updating system updated to their most recent firmware version. The over-the-air update approach enables a device with communication capabilities to be updated using a wireless connection with a server, for example a dedicated firmware updating server. Therefore, the devices can remain in-situ without a need to retrieve or recall them for updates or physical connection to another computing device. However, a number of constraints accompany the over-the-air approach. For example, the device needs to be reachable from a communications perspective, an adequate data transfer rate needs to be available, and the power supply to the device needs to be adequate, such as in the case of battery-powered beacons.

Consequently, updates sent to the device are typically processed in order to account for limited bandwidth in respect of the connection between the updating server and the device, and the fact that wireless reception by the device consumes a relatively large amount of power compared to normal tasks performed by the device. In this regard, for example, the update can be processed by packaging it using a suitable packaging algorithm for the data type involved. This, however, then leads to a requirement that the device receiving the processed update has to be able to reverse the processing of the data in order to use it.

Furthermore, an update common to all devices using the updating system may not be available. Instead, updates for devices can be required on an individual basis, or groups of more than one device can require respectively different updates to be applied to them. Additionally, in some scenarios, the devices can be accessible for updating purposes by more than one server and so the firmware configuration of a given device is not under the exclusive control of a single updating server. Also, for some devices, it is possible to update the firmware locally, for example by tethering the device to another computing device to apply the update.

Therefore, whilst an updating server, hereinafter referred to as a "content server", can be programmed to record and thus track the update status and version of the firmware for a given device, such an approach assumes that the content server is the only server to have access to the device for updating purposes and so there is an assumption that the information held by the content server is always up-to-date. Similarly, whilst the content server can maintain a record of processes supported by each device or group of devices for the purposes of communication of updates from the content server to the device(s), since the content server is not necessarily the only entity to have access to the processes stored by a given device, and it is possible that the device or group of devices are controlled by another server or other servers, or they can be accessed locally for updating purposes. This can lead to changes being made to the device(s) outside the scope of detection of the content server and so the record of processes supported by the content server becomes inaccurate.

In order to overcome such difficulties, a known device updating procedure can require the content server to interrogate the device to be updated in order to identify a processing technique, available to the updating server and supported by the device to be updated, which can be used by the content server to communicate, in processed form, the update for the device. However, the known updating procedure assumes that a common processing technique can be found. Additionally, the interrogation of the device requires the device to send data back to the content server in response to a query concerning processing techniques supported by the device, the device thereby consuming power.

BRIEF SUMMARY OF THE INVENTION

According to a first aspect of the present invention, there is provided a software update system comprising: a client device having non-OS system software to be updated; a client updating server located remotely from the client device and capable of communicating with the client device; and a device capability manager arranged to access technical capability data relating to the client device; wherein the client updating server is arranged to retrieve a first update required to update at least part of the non-OS system software of the client device; the client updating server comprises an update optimiser arranged to cooperate with the device capability manager to determine an organisational scheme to apply to the first update so as to optimise updating of the client device, the determined organisational scheme being compatible with a technical capability of the client device, and the update optimiser is arranged to identify a recovery function to recover the first update from an instance of the first update organised in accordance with the selected organisational scheme; the device capability manager is arranged to use the capability data in order to determine necessary functionality required by the client device to implement the recovery function identified by the update optimiser; the client updating server comprising an update package generator responsive to the update optimiser and arranged to generate an update package comprising a second update to enable the client device to support the recovery function; the client updating server comprises an update communications unit arranged to communicate the update package to the client device; and the client device is arranged to receive the update package and extract and install the second update.

The update package generator may comprise the update optimiser.

The client updating server may be arranged to instruct the update communications unit to communicate the update package to the client device before the first update.

The client updating server may be arranged to instruct the update communications unit to communicate separately the update package and the instance of the first update organised in accordance with the selected organisational scheme to the client device.

The update communications unit may be arranged to send an advice to the client device to expect to receive the update package to facilitate recovery of the first update from the instance of the first update organised in accordance with the selected organisational scheme.

The update communications unit may be arranged to send the instance of the first update organised in accordance with the selected organisational scheme before the update package and the advice to the client device accompanies the instance of the first update organised in accordance with the selected organisational scheme.

The client updating server may be arranged to retrieve the first update from a repository of updates.

The client updating server may comprise a capability data repository accessible by the device capability manager; the capability data repository may record existing functionality supported by the client device.

The device capability manager may be arranged to determine the necessary functionality required by the client device to implement the recovery function by reference to the capability data repository.

The device capability manager may be arranged to compare a target functionality required of the client device with the existing functionality supported by the client device in order to identify a functionality differential constituting the necessary functionality required by the client device.

The client updating server may comprise a functionality repository; the functionality repository may comprise a plurality of operating functions.

The update package generator may be arranged to access the functionality repository in order to retrieve an operating function from the functionality repository in order to provide at least part of the functionality of the functionality differential.

The second update may comprise the operating function.

The capability data may comprise the technical capability of the client device and the existing functionality supported by the client device.

The update package may comprise the first update organised in accordance with the selected organisational scheme.

The update package generator may be arranged to generate another update package comprising the first update organised in accordance with the selected organisational scheme.

The update optimiser may be arranged to identify another recovery function to be applied in combination with the recovery function to recover the first update from an instance of the first update organised in accordance with the selected organisational scheme The non-OS system software may be firmware.

The client device may comprise a communications module and the first update may pertain to the communications module.

The organisational scheme may comprise at least one of a compression scheme; an encryption scheme; a data differencing scheme; and a delta encoding scheme.

The update package generator may be responsive to the device capability manager by being responsive to the necessary functionality required by the client device determined by the device capability manager.

Determination by the device capability manager of the necessary functionality required may be determination of functionality lacked by the client device to implement the recovery function identified by the update optimiser.

The capability data may be stored as one more of: a table, an array, and/or a database.

The update optimiser may be arranged to select the organisational scheme based upon one or more of the following criteria: volatile memory usage; non-volatile memory usage; size of physical blocks of memory: degree of distribution of changes associated with implementation of the first update; a size of the update package; and/or processing time required by the client device.

The recovery function may be a compiled code, a compiled script, an interpretable code or an interpretable script.

The first update may relate to a non-update maintenance functional aspect of the client device.

The functional aspect may be: a method for generating random numbers, a method for calculating checksums, a method for decoding the data that follows in a subsequent update package, a method for decompressing the update package, a function of a GNSS receiver, a vocoder plug-in, a new feature, a new AT command, or a security patch.

The client updating server may be arranged to identify the first update required to update a group of client devices comprising the client device, and the update communications unit may be arranged to communicate wirelessly the update package to all of the client devices of the group of client devices.

The update package and/or the first update may be free from queries requiring a response from the client device.

The update package generator may comprise a delta file generator.

The update package generator may be arranged to determine the necessary functionality required by the client device to implement the recovery function by reference to the capability data repository.

The update package generator may be arranged to compare a target functionality required of the client device with the existing functionality supported by the client device in order to identify a functionality differential constituting the necessary functionality required by the client device.

The device capability manager may be arranged to determine functionality possessed by the client device or a type of client device in response to receipt of a function list request message from the update package generator.

The client updating server may comprise an Open Mobile Alliance Data Management (OMADM) server and a capability data repository accessible by the OMADM server; the capability data repository may record existing functionality supported by the client device.

The OMADM server may be arranged to determine functionality possessed by the client device or a type of client device in response to receipt of a function list request message from the update package generator.

The device capability manager may be arranged to receive a function list request message and in response thereto send the function list request to the OMADM server; the OMADM server may be arranged to determine functionality possessed by the client device or a type of client device in response to receipt of the function list request message from the device capability manager.

The update package may be communicated to the client device in accordance with a data structure definition; the data structure definition may comprise: a required functionality content field reserved to contain the update package.

The another update package may be communicated to the client device in accordance with a data structure definition; the data structure definition may comprise a required functionality content field reserved to contain the another update package.

The data structure definition may further comprise: an update content field reserved to contain the instance of the first update organised in accordance with the selected organisational scheme.

The data structure definition may further comprise: a function indicator field reserved to contain an identifier of a function associated with recovering the instance of the first update organised in accordance with the selected organisational scheme; and the function indicator field may be arranged to accompany the required functionality content field.

The data structure definition may further comprise: another required functionality content field reserved to contain the another update package.

The data structure definition may further comprise: another update content field reserved to contain an instance of another organised update.

The data structure definition may further comprise: another function indicator field reserved to contain another identifier of another function associated with recovering the instance of the another organised update; and the another function indicator field may be arranged to accompany the another required functionality content field.

According to a second aspect of the present invention, there is provided a firmware over the air updating system comprising the software update system as set forth above in relation to the first aspect of the invention.

According to a fourth aspect of the present invention, there is provided a method of updating a client device having non-OS system software to be updated, the method comprising: accessing capability data relating to the client device; retrieve a first update required to update at least part of the non-OS system software of the client device; determining an organisational scheme to apply to the first update so as to optimise updating of the client device, the determined organisational scheme being compatible with a technical capability of the client device; identifying a recovery function to recover the first update from an instance of the first update organised in accordance with the selected organisational scheme; using the capability data in order to determine necessary functionality required by the client device to implement the recovery function identified by the update optimiser; generating an update package in response to the determination of the necessary functionality required by the client device, the update package comprising a second update to enable the client device to support the recovery function; communicating the update package to the client device; and the client device receiving the update package and extracting and installing the second update.

It is thus possible to provide a software update system and a method of updating a client device that obviates, in some cases, the need to interrogate client devices, thereby avoiding communications difficulties encountered due to paucity of bandwidth and/or a need to conserve power consumed by the client device. Additionally, the system and method optimises communication of updates to the client device whilst ensuring that a client updating server and the client device both support a common organisational scheme to be applied to the update to facilitate communication to the client device. Furthermore, the client device is placed in a condition where the device can support an optimum organisational scheme for a processing capability of the client device. Additionally, the system and method facilitates minimal updating of content, thereby reducing the risk of data transfer interruption, for example owing to physical perturbations, such as radio signal loss and/or power loss. The risk of corrupting the data being transferred is also reduced on account of there being less data at risk of corruption, and the amount of memory required to store update packages is reduced too.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
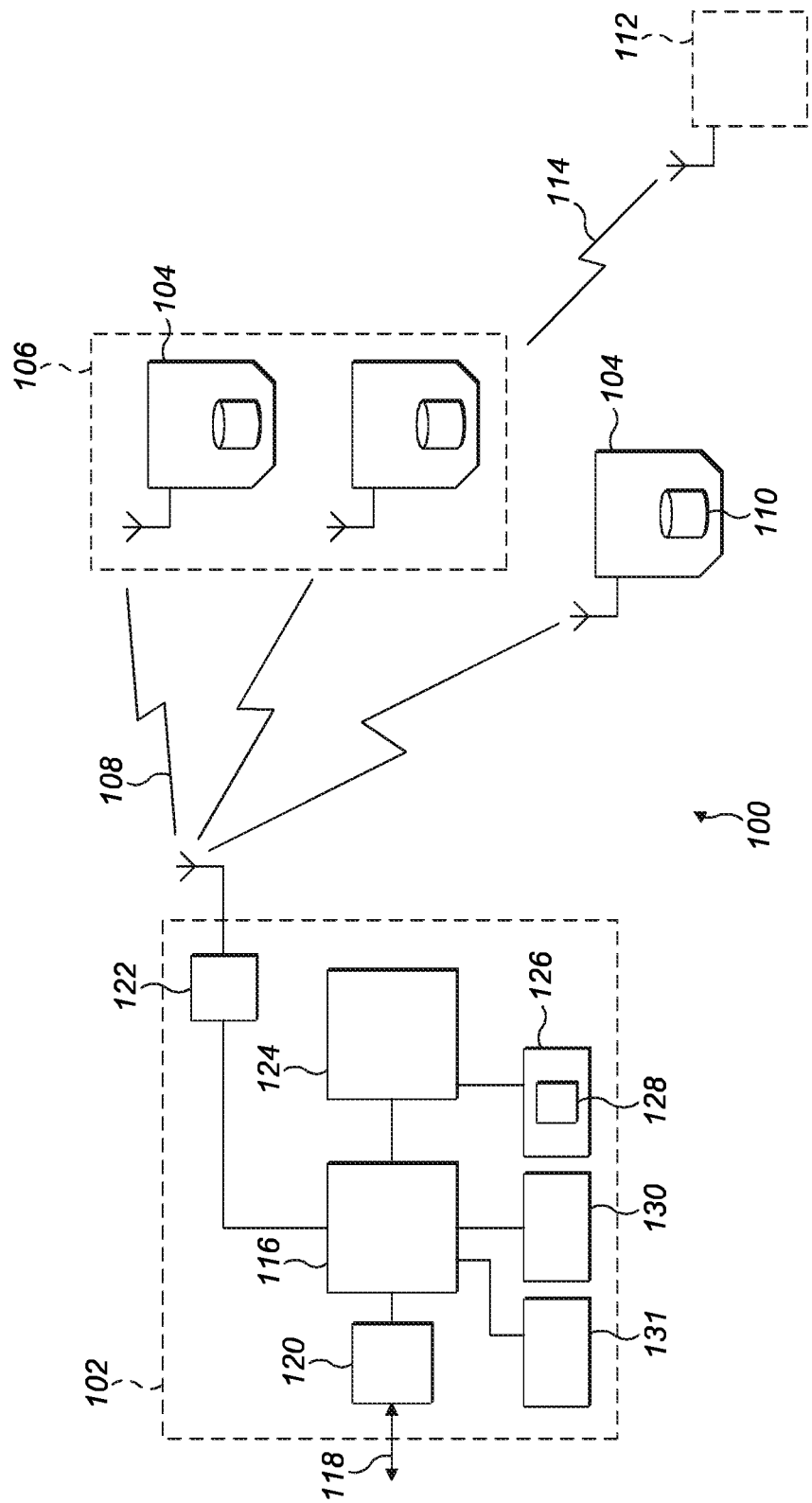
FIG. 1 is a schematic diagram of a software updating system constituting an embodiment of the invention.

Throughout the following description identical reference numerals will be used to identify like parts.

Referring to FIG. 1, a software updating system 100, for example a firmware over the air updating system, comprises a client updating server 102 capable of communicating with a client device 104 or a group of client devices 106 via a wireless communications interface 108, the client device 104 or group of client devices 106 being located remotely from the client updating server 102. Each client device comprises respective non-OS software 110 that can be updated. The updating server 102 can be any suitable computing arrangement, for example a Personal Computer (PC), workstation, minicomputer, mainframe computer, etc. The updating server 102 can comprise, for example, any suitable bus configurations, networked platforms, and/or multi-processor platforms. Various operating systems can be used including UNIX™, Solaris™, Linux™, Windows™, MacOS™, or any other suitable operating system.

Another updating server 112, for example an equipment manufacturer server, outside the software updating system 100 is, optionally, provided and capable of communicating with one or more of the client devices 104 via the wireless communications interface 108 or another wireless communications interface 114. In this respect, the client device 104 comprises a wireless communications module (not shown) to receive wireless communications from the updating server 112.

Figure 2:
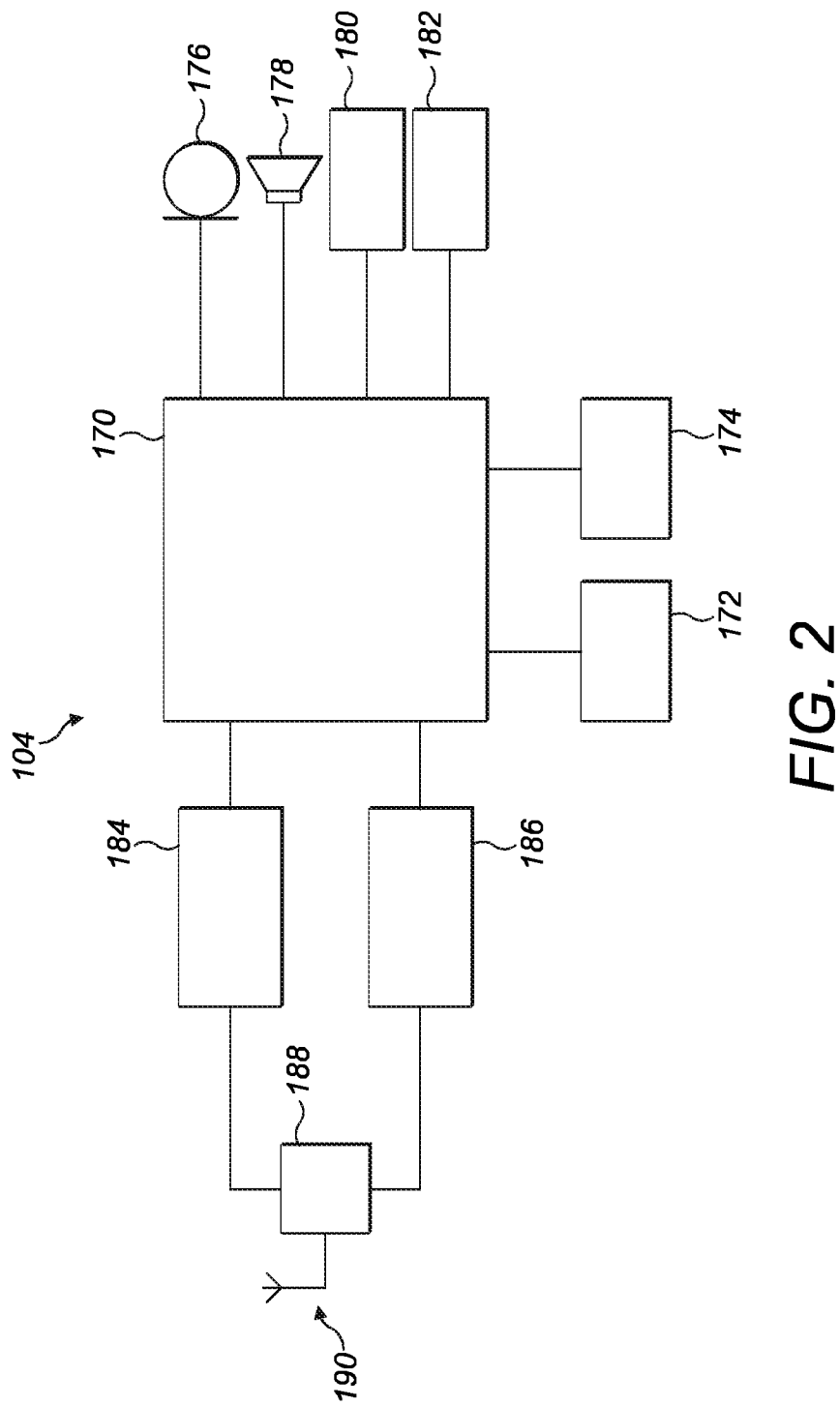
FIG. 2 is a schematic diagram of a client device used in the system of FIG. 1.

Turning to FIG. 2, in this example the client device 104 is a wireless communications device, for example a User Equipment (UE) unit of a cellular . . . comprises a processing resource 170, for example a microprocessor, a volatile memory 172, for example a RAM, and a non-volatile memory 174, for example a ROM, each being coupled to the processing resource 170. The processing resource 170 is also coupled to a microphone 176, a speaker unit 178, a keypad 180 and a display 182. The processing resource 170 is also coupled to a transceiver comprising a transmitter chain 184 and a receiver chain 186, the transmitter and receiver chains 184, 186 being coupled to a duplexing component 188. The duplexing component 188 is coupled to an antenna 190. The skilled person should appreciate that the architecture of the client device 104 described above comprises other elements, but such additional elements have not been described herein for the sake of preserving conciseness and clarity of description. The skilled person should also appreciate that the client device 104 need not necessarily comprise wireless communications capabilities or can comprise wireless and wireline communications capabilities. In this respect, communications with the client device 104 can be via wireline communications.

Referring back to FIG. 1, the client updating server 102 comprises an update package generator 116 operably coupled to a communications network 118, for example a Local Area Network (LAN), via a network interface, such as a LAN interface 120. The update package generator 116 is also operably coupled to an update communications unit 122 to support communications over the wireless communications interface 108.

The client updating server 102 also comprises an update optimiser 124 operably coupled to the update package generator 116 and a device capability manager 126, and the device capability manager 126 being capable of storing capability data in a capability data repository 128. The capability data repository comprises a record of the technical capabilities of each client device or each type of client device 104 using the software updating system 100, including in this example existing functionality supported by the client device or each type of client device 104. The capability data can be stored in any suitable form, for example a table, an array and/or a database. In this example, the information contained in the capability data repository is predetermined by manufacturers. An update store 130 is also operably coupled to the update package generator 116 and stores, for example, images of update data, such as firmware images. A functionality repository 131 is operably coupled to the update package generator 116 and stores a plurality of operating functions. The operating functions are a collection or library of functions that can be employed by various client devices, either alone or in combination, in order to perform required tasks, for example tasks associated with recovering an update that has been organised in accordance with a selected organisational scheme, as will be described in further detail later herein. The plurality of operational functions constitutes a toolkit of functions.

Figure 3:
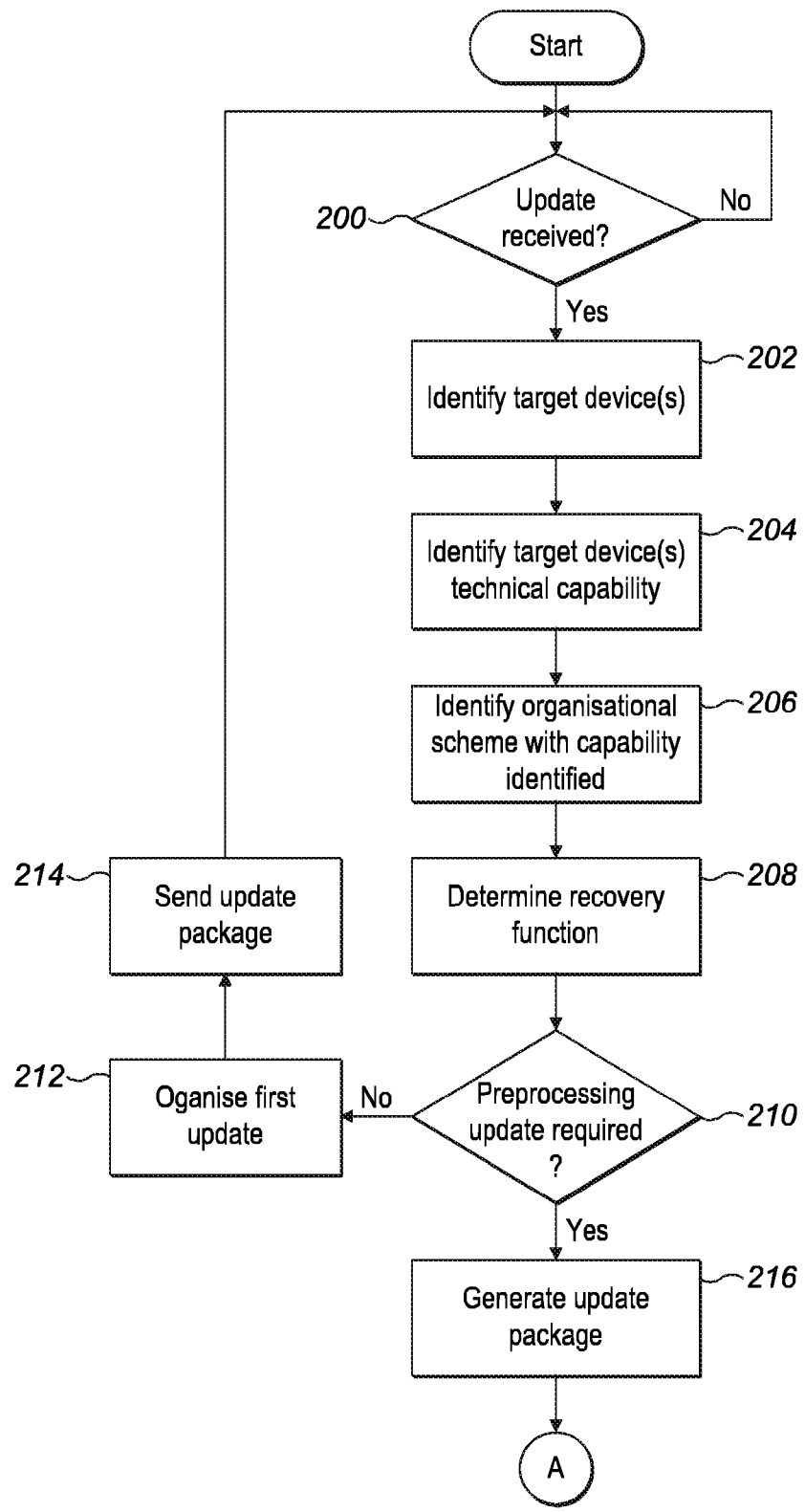
FIG. 3 is a flow diagram of a first part of a method of operation of a first part of the system of FIG. 1 and constituting another embodiment of the invention.

In operation (FIG. 3), the update package generator 116 receives updates via the network interface 120 to update at last part of the non-OS software of one or more client devices 104 and stores received updates in the update store 130, which constitutes a repository of updates. Once the update package generator 116 determines (Step 200) the receipt of a first update, the update package generator 116 identifies (Step 202) the target device(s) to which the first update applies. This can be the individual client device 104 or the group of client devices 106.

The first update is, in this example, a firmware update, and relates to the communications module of the client device 104. However, the first update can be any suitable non-OS software, which is intended to include data, for example, files, such as configuration files, algorithms, algorithm libraries, computer programs, code images, instructions, which can relate to any operational part of the client device 104 that can be updated over-the-air. The non-OS software to be updated relates to a non-update maintenance functional aspect of the client device 104, for example a method for generating random numbers, a method for calculating checksums, a method for decoding the data that follows in a subsequent update package, a method for decompressing the update package, a function of a GNSS receiver, a vocoder plug-in, a new feature or a new AT command. The first update can be a software update, a new or replacement file, a new or replacement device configuration, a security patch and/or a specific command for the client device 104 to perform. In this respect, it should be appreciated that the client device 104 has functional aspects that relate to maintaining updating mechanism (associated with a second update described later herein) and there are other functional aspects that do not relate to maintaining the updating mechanism of the client device 104; the first update relates to these other functional aspects that do not relate to maintaining the updating mechanism.

Once the client device or devices to which the first update applies has or have been identified (Step 202), the update package generator 116 communicates the first update to the update optimiser 124 and the identity of the client device 104 or group of client devices 106, and the update optimiser 124 cooperates with the device capability manager 126 in order to identify (Step 204) the technical capabilities of the client device 104 or the group of client devices 106. In some examples, the update package generator 116 can comprise a delta file generator to generate a difference between an existing version of the non-OS software to be updated and the update received, the difference constituting the first update that is communicated to the update optimiser 124. The device capability manager 126 then accesses the capability data 128 in order to determine the technical capability of the client device 104 or the group of client devices 106. For the sake of conciseness of description, hereinafter references to the client device 104 or the group of client devices 106 will be abbreviated to reference to the client device 104. However, the skilled person will appreciate that the operational principles nevertheless apply to the group of client devices 106, with appropriate modification where necessary.

The technical capabilities of the client device 104, once determined by the device capability manager 126, are communicated back to the update optimiser 124, the update optimiser 124 using the technical capability data associated with the client device 104 in combination with the first update identified by the update package generator 116 in order to identify (Step 206) an organisational scheme according to which the first update can be organised within the technical capabilities of the client device 104 in order to communicate the first update in an optimum manner, thereby for example optimising updating of the client device 104. The organisational scheme can be selected based on one or more of the technical capabilities of the client device, for example: memory, volatile memory, non-volatile memory or size of physical blocks of memory, degree of distribution of changes associated with implementation of the first update, processing time required, processor capacity and/or battery life. The differences between a source firmware image, currently residing on the client device 104, and a target firmware image, intended to reside on the client device 104 as a result of the update process, can be taken into account. Likewise, the size of an update package can also be taken into account, not just from a memory usage perspective, but also a transmit time and power consumption perspective. In this example, the organisational scheme is a compression scheme, but the skilled person should appreciate that other techniques for organising the first update, for example for optimum transmission, can be employed. Examples of other organisational schemes are: encryption schemes, data differencing schemes and/or delta encoding schemes.

The update optimiser 124 then determines (Step 208) a recovery function, which is one or more processing steps that the client device 104 has to implement in order to reverse the organisation of the first update that has been organised in accordance with the organisational scheme identified, because prior to communication to the client device 104, the first update is to be organised in accordance with the organisational scheme selected by the update optimiser 124. The recovery function can be considered an inverse or reverse of the organisational scheme and the technical specification of the client device 104 needs to support implementation of the recovery function. The recovery function enables the first update to be recovered from an instance of the first update organised in accordance with the selected organisational scheme. The recovery function can be implemented as compiled code, compiled script, interpretable code or an interpretable script.

The update optimiser 124 communicates the recovery function or the identity of the recovery function to the device capability manager 126. Using the knowledge of the recovery function required and the technical capabilities of the client device 104, the device capability manager 126 identifies (Step 210) functionality that the client device 104 is required to possess in order to implement the recovery function. In this respect, the device capability manager 126 is arranged to compare a target functionality required of the client device 104 with the existing functionality supported by the client device 104 in order to identify any functionality deficit or differential constituting the necessary functionality required by the client device 104. In some examples, the differential can be predetermined based upon a priori knowledge of "source" functionality supported by the client and "target" functionality that needs to be supported by the client device 104; the functionality differential information can be stored, for example, in a database or lookup table, to facilitate the identification of the functionality differential.

In the event that no deficit exists, the update package manager 116 can organise (Step 212) the first update into the instance of the first update arranged according to the selected organisational scheme and constituting the update package, and then communicate (Step 214) the update package to the client device 104 before returning to awaiting receipt of further updates (Step 200). Otherwise, the necessary functionality, which can be a single function or a plurality of functions, is communicated to the update package generator 116 and the update package generator 116 provides the necessary functionality in the form of the second update mentioned briefly above. In order to provide the necessary functionality, the update package generator 116 therefore, in this example, accesses the functionality repository 131 to retrieve one or more operational functions in order to reduce, at least in part, the functionality deficit (the client device 104 may already support part of the necessary functionality), i.e. the retrieval from the functional repository 131 provides at least part of the functionality lacked by the client device 104 to implement the recovery function and hence bridge the functionality differential. As such, the second update comprises or represents, in this example, at least one operating function.

In some circumstances, in the event that the recovery function is insufficient to provide all of the necessary functionality, the update optimiser 124 is arranged to identify another recovery function to be applied in combination with the recovery function to recover the first update. The operational function or functions are therefore retrieved by the update package generator 116 from the functionality repository 131 and incorporated into an update package, details of which are described later herein.

Figure 4:
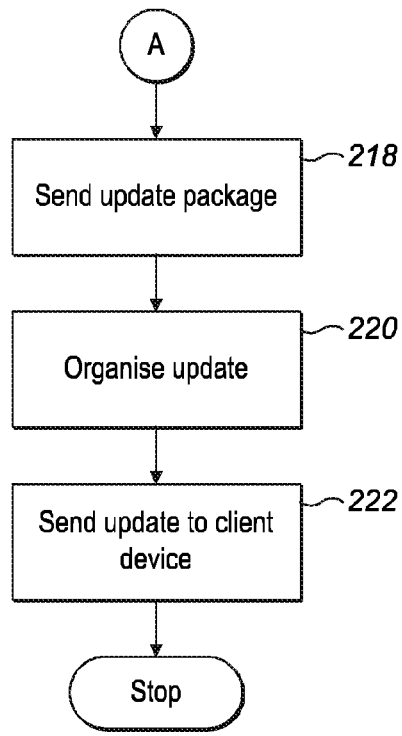
FIG. 4 is a flow diagram of a second part of the method of FIG. 3.

The update package generator 116, upon receipt or recovery of the second update, responds by arranging (Step 216) the second update in a form suitable for optimum communication to the client device 104 within the capabilities of current functionality supported by the client device 104. Referring to FIG. 4, the arrangement of the second update constitutes the update package, which the update package generator 116 then communicates to the update communications unit 122, which arranges the update package in accordance with a data structure definition supported by one or more communications protocols being employed and communicates (Step 218) the second update to the client device 104.

In this example, the update communications unit 122 is instructed to communicate the second update in the form of the update package prior to and as an independent communication to the communication of the first update. In this respect, the update package generator 116 then organises (Step 220) the first update according to the organisational scheme determined by the update optimiser 124 and then the update package generator 116 communicates (Step 222) the first update in organised form to the client device 104 via the update communications unit 122 and the wireless communications interface 108. In this example, the update package generator 116 generates another update package comprising the first update organised in accordance with the selected organisational scheme.

Figure 5:
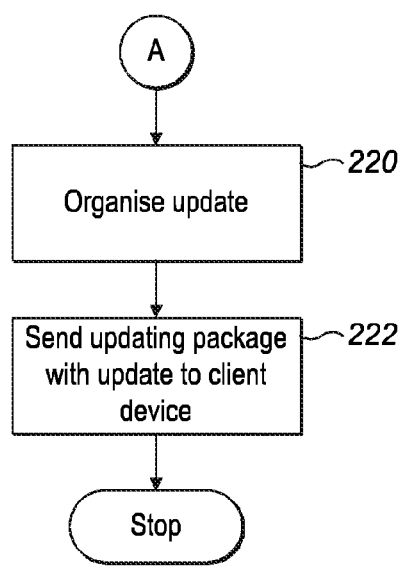
FIG. 5 is a flow diagram of an alternative to the second part of the method of FIG. 4 and constituting a further embodiment of the invention.

As suggested above, the first update and the second update can be communicated to the client device 104 in a number of different ways. For example (FIG. 5), the first and second updates can be communicated to the client device together and as part of a single communication, in which case the update package generator 116 organises (Step 220) the first update according to the organisational scheme determined by the update optimiser 124 and then the update package generator 116 communicates the update package comprising the instance of the first update in organised form and the second update to the update communications unit 122, which arranges the update package in accordance with a data structure definition supported by one or more communications protocols being employed and communicates (Step 222) the update package to the client device 104 (or all devices requiring the second update) via the wireless communications interface 108.

Alternatively, with implementation of a suitable protocol, the first update can be communicated to the client device 104 as a separate communication, the another update package mentioned above, and held by the client device 104 prior to implementation until the second update is received and processed. In this regard, the update communications unit 122 is arranged to send an advice to the client device 104 to expect to receive the update package to facilitate recovery of first update from the instance of the first update organised in accordance with the selected organisational scheme. Furthermore, the communication of the instance of the first update can be accompanied by the advice to the client device 104.

Figure 6:
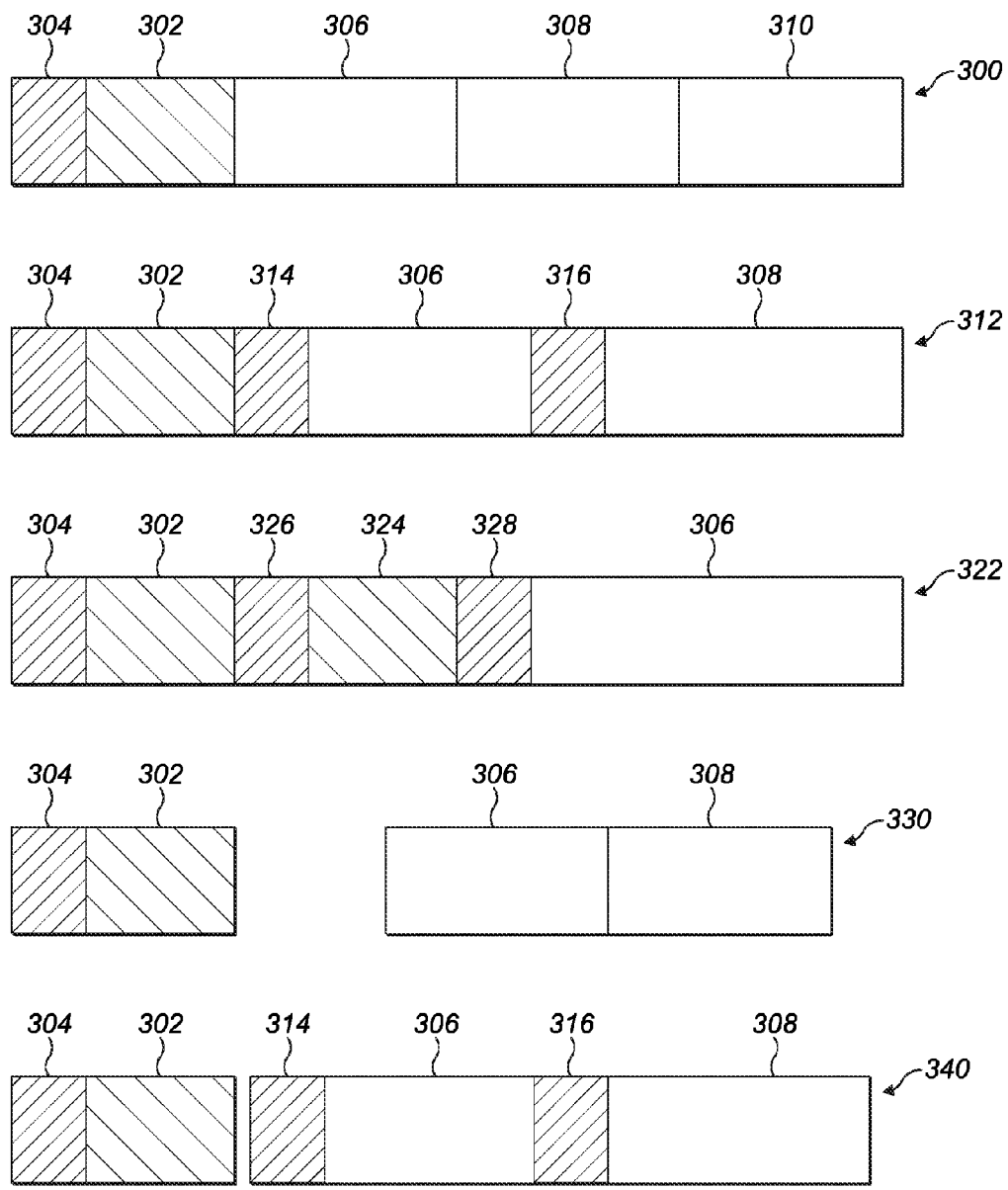
FIG. 6 is a schematic diagram of different data structure definition structures for the system of FIG. 1.

When communicating the update package, with or without the organised first update, in accordance with the data structure definition, the data structure definition can be structured in a number of different ways and comprises a required functionality field reserved to contain the update package. Referring to FIG. 6, a first data structure definition 300 comprises the required functionality content field 302, which in this example is accompanied by a functionality key identifier or indicator field 304. The first data structure definition 300 also comprises a first update content field 306, a second update content field 308 and a third update content field 310 reserved for instances of first updates or parts thereof to be communicated to the client device 104 when accompanying the second update in the required functionality field 302.

Where more than one function needs to be communicated to the client device 104 in order to enable the client device 104 to support the recovery function, a second data structure definition 312 can be employed. In common with the first data structure definition 300, the second data structure definition 312 comprises the required functionality field 302 accompanied by the functionality key identifier or indicator field 304. In this example, the client device 104 already possesses one function required to support the recovery function, but requires another one to support another recovery function to be used with a different update to the non-OS software or a different part of the same first update. In this regard, the second data structure definition 312 comprises a first function identifier or indicator field 314 that precedes the first update field 306 so as to indicate to the client device 306 that a certain function is required to support the recovery function associated with the update contained in the first update field 306. Similarly, the second data structure definition 312 also comprises a second function identifier or indicator field 316 that precedes the second update field 308 so as to indicate to the client device 306 that a certain function is required to support the recovery function associated with the update contained in the second update field 308. However, in this example, the client device 104 already supports the function identified in the second function identifier or indicator field 316 and so the data structure does not possess a field reserved for the function indicated in the second function identifier or indicator field 316.

Where it is necessary to communicate more than one update package to the client device 104 in order that the client device 104 be able to support the recovery function in respect of the first update, a third data structure definition 322 is employed. In this example, it is also assumed that in addition to a first and second function, the client device 104 supports a third function required to support the recovery function in respect of the first update. In this respect, the third data structure definition 322 comprises the required functionality field 302 accompanied by the functionality key identifier or indicator field 304 reserved for the first function, but also comprises another required functionality field 324 accompanied by another functionality key identifier or indicator field 326. The third data structure definition 312 also comprises a third function identifier or indicator field 328 that precedes the first update field 306 so as to indicate to the client device 306 that in addition to the functions being communicated to the client device 104, a certain other function (identified in the third function identifier or indicator field 328) is required to support the recovery function associated with the update contained in the first update field 306.

In embodiments where the update package containing the second update is communicated separately from the first update, a first two-part data structure definition 330 can be employed as a two-part analogue of the first data structure definition 300. The first two-part data structure definition 330 supports communication of an update package along with two update fields corresponding to the same first update, which are sent separately from the update package containing the second update.

Likewise, a second two-part data structure definition 340 can be employed. In the context of the second data structure definition 312, the second two-part data structure definition 340 is a two-part equivalent analogue and supports communication of an update package along with two update fields corresponding to the first update, which are sent separately from the update package containing the second update and support the possibility that the client device 104 supports a function that is required in addition to the functionality associated with the second update.

Figure 7:
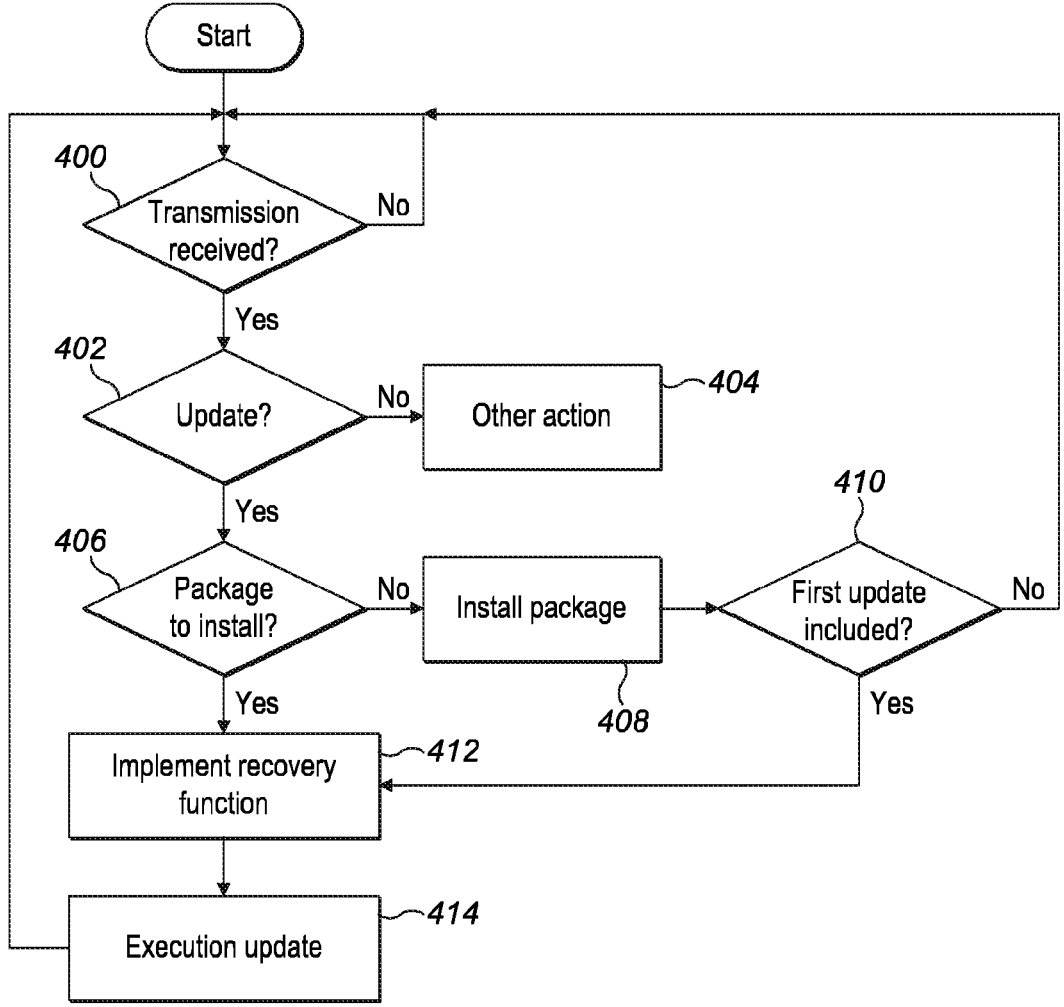
FIG. 7 is a flow diagram of a method of operation of a second part of the system of FIG. 1 constituting yet another embodiment of the invention.

The client device 104 can be any suitable communications-enabled device, for example but not exclusively a wireless communications device, such as a cellular communications handset, capable of implementing over-the-air software updates. In this example, the client device 104, and referring to FIG. 7, is arranged to await receipt (Step 400) of a wireless communication. The client device 104 then determines (Step 402) whether the data received relates to an update of non-OS software. In the event that the data received does not relate to the update of the non-OS software, the client device 104 processes (Step 404) the received data in accordance with the design of the client device 104. In this respect, for the sake of conciseness of description, the description of the operation of the client device 104 will be confined to processing relating to updating the non-OS software of the client device 104.

Furthermore, for the sake of clarity and conciseness of description, the operation of the client device 104 will be described in the context of the update package, comprising the second update, being received prior to and in a separate communication to the first update in organised form as another update package. In this respect, the second update is transmitted using a separate communication burst or bit stream to that used to communicate the organised first update. Consequently, in the event that the data received relates to an update (Step 402), the client device 104 then determines (Step 406) whether the communication relates to an update package that needs to be installed prior to processing of any non-OS software update. In the event that the data received comprises the update package, the client device 104 extracts the second update from the update package or reverses any organisation of the second update used by the client updating server 102 to communicate the second update to the client device 104, the update package being arranged in such a way that the client device 104 can recover the second update from the update package using existing functionality supported by the client device 104. The extraction of the second update can be simple interpretation, decryption and/or decompression. The client device 104 then installs or implements (Step 408) the second update.

The client device 104 then determines (Step 410) whether the data received by the client device 104 included the first update in organised form. In the event that the data received included the first update in organised form or the data received was determined (Step 406) by the client device 104 only to comprise the first update, because the client device already possessed the functionality necessary to implement the recovery function, the client device 104 proceeds to recover (Step 412) the first update from the data received. Otherwise, the client device 104 awaits (Step 400) receipt of further data relating to updates of the non-OS software. Once the first update has been recovered from the organised form of the first update used for communications purposes, the client device 104 executes or implements (Step 414) the first update, which serves to update the non-OS software of the client device 104.

Figure 8:
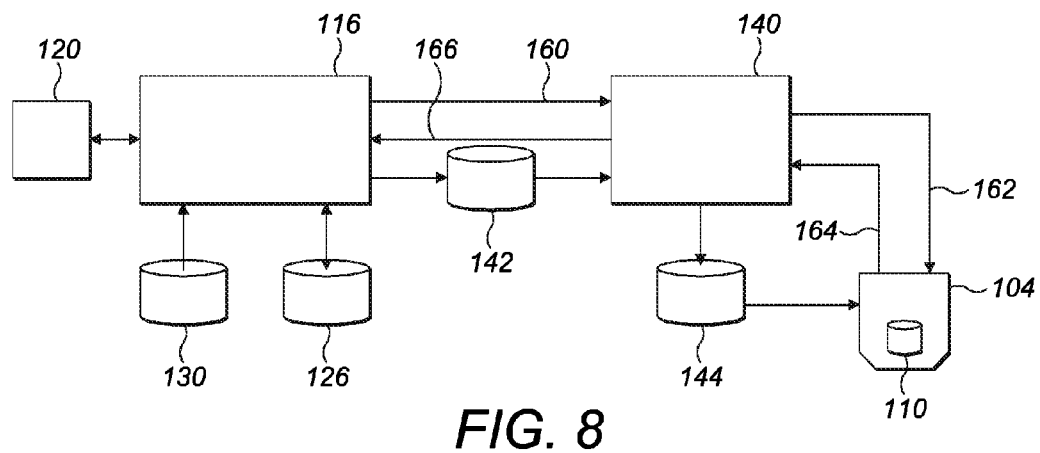
FIG. 8 is a schematic diagram of an alternative architecture for the system of FIG. 1 and constituting another embodiment of the invention.

In other embodiments (FIG. 8), the client updating server 102 can be distributed in nature and/or comprise other functional units to support particular implementation architectures. In this respect, the functionality of the update optimiser 124 can be incorporated into the update package generator 116. Additionally, or alternatively, a content server 140 can be provided that is capable of communicating with the update package generator 116. The content server 140 acts as an intermediary and handles updates generated by the update package generator 116. The content server 140 is also capable of communicating wirelessly with the client device 104, and the content server 140 is capable of communicating, in this example, wirelessly with the client device 104.

In operation, instead of the update optimiser 124 interrogating the device capability manager 126, the update package generator 116 sends a query 160, for example a function list request message, to the content server 140 for information relating to the technical capabilities and/or the functionality supported by the client device 104. In response thereto, the content server 140 is capable of interrogating 162 the client device 104 in order to determine the technical capabilities and/or functionality supported by the client device 104. Once the technical capabilities and/or functionality supported by the client device 104 have been communicated 164 by the client device 104 to the content server 140, the content server 140 communicates 166 the technical capabilities and/or functionality supported by the client device 104 back to the update package generator 116. In this regard, it should be appreciated that some of the information relating to the technical capabilities and the functionality supported by the client device 104 can be provided by the device capability manager 126 in accordance with the distributed approach mentioned above. Once the update package generator 116 has the information requested, the update package generator 116 generates the update package comprising the first update in organised form. In this respect, the second update relating to the recovery function and the identification of the organisational scheme is the same as described above in relation to the previous embodiment. Thereafter, the update package comprising the first update is communicated in a first communication 142 to the content server 140. The content server 140 then communicates the update package comprising, in this example the first update in organised form and the second update, in a second communication 144, for example by pushing the second communication 144, to the client device 104, depending upon implementation convenience. In this respect, a permanent or temporary storage device can be used to hold the content of the second communication 144, which can be stored by the content server 140 and accessed by the client device 104. In any event, once the client device 104 has obtained the content of the second communication 144, the client device 104 can process the received first update and second update in the manner already described above. Whilst, in this example, the first and second updates are communicated together in a single update package, the skilled person will of course appreciate that the first update in organised form and the second update can be communicated to the client device 104 in accordance with any of the other communication formats, for example as separate update packages.

Figure 9:
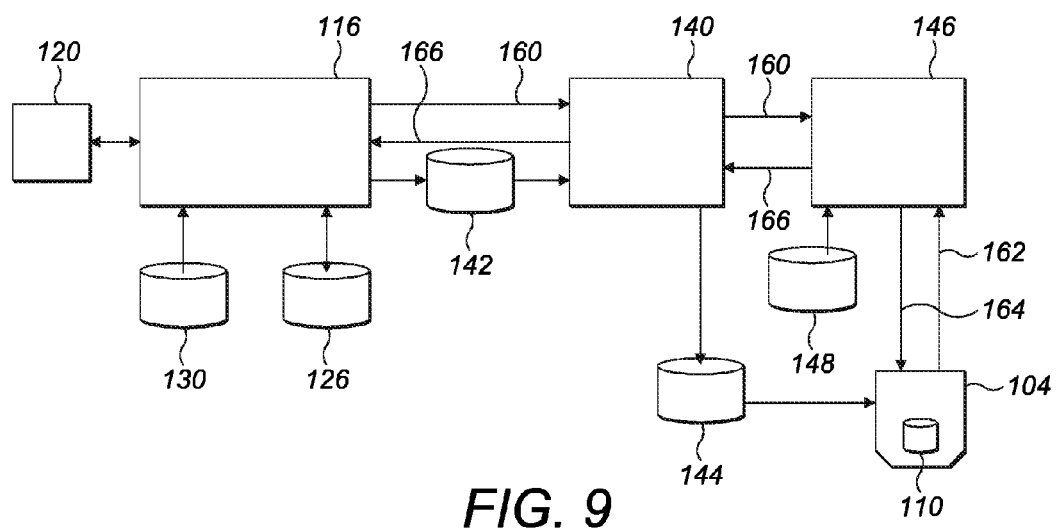
FIG. 9 is a schematic diagram of yet another architecture for the system of FIG. 1 and constituting a further embodiment of the invention.

In a modification of the above embodiment (FIG. 9), an Open Mobile Alliance Data Management (OMADM) server 146 can be provided that can serve as an intermediary between the content server 140 and the client device 104 for the purpose of obtaining the information pertaining to the technical capabilities and/or the functionality supported by the client device 104. In this respect, the query 160 received by the content server 140 from the update package generator 116 is forwarded to the OMADM server 146 in order to obtain the information requested. Consequently, the OMADM server 146 can interrogate 162 the client device 104 in order to determine the technical capabilities and/or functionality supported by the client device 104 of a type of client device 104. Once the technical capabilities and/or functionality supported by the client device has been communicated 164 by the client device 104 to the OMADM server 146, the OMADM server 146 can communicate 166 this information back to the content server 140 for handling in the same manner as described above in relation to the previous embodiment. Alternatively, instead of interrogating the client device 104, the OMADM server 146 can have access to a database 148, constituting the repository, of the technical capabilities and/or functionality supported by the client device 104 or the type of client device 104 and, in response to the query 160 forwarded by the content server 140, the OMADM server 146 can access the database 148 and retrieve the technical capabilities and/or functionality supported by the client device 104 and communicate 166 this information back to the content server 140. In this regard, and as mentioned above, the information concerning the technical capabilities and/or the functionality supported by the client device 104 is handled in the same manner as described above in relation to the previous embodiment. Once generated, the update package(s) can be communicated to the client device 104. In one example, the update package(s) can be communicated wirelessly, but other modes are contemplated, for example transferred to the OMADM server 146 by portable memory device (not shown) for subsequent communication by the OMADM server 146 to the client device 104.

It should be appreciated that, in other embodiments, the query need not originate specifically from the update package generator 116 and can originate from any other appropriate entity in the client updating server 102 or even the software updating system 100, for example the device capability manager 126, which can receive the query, for example the function list request. The communication of the query to the OMADM server 146 can be direct or indirect.

In yet another embodiment, the OMADM server 146 is not required. In this embodiment, it is assumed that instead of determining the functionality supported by the client device 104 or maintaining a store of such information, the first update will always be accompanied, followed or preceded by the second update required to implement the recovery function. Consequently, in any event, the second update is communicated to the client device 104 irrespective of whether or not the recovery function is already supported by the client device 104. As such, in order to support this approach, and referring to FIG. 10, the update package generator 116 and the content server 140 support a combined communication 150 of the update package from the update package generator 116 to the content server 140. Additionally, the update package generator 116 and/or the content server 140 support a combined communication 152 of the update package from the content server 140 to the client device 104. Once determined using any suitable implementation, for example of the kind already described above, the update package generator 116 is arranged to communicate to the content server 140 the first update, and the second update either as part of the update package or as another update package. Similarly, the content server 140 is arranged to communicate to the client device 104 the first update, and the second update either as part of the update package or as another update package. Depending upon implementation needs, one or more transitory (or permanent) copies of the another update package and/or the update package can be stored for shared use by the update package generator 116 and the content server 140, and the content sever 140 and the client device 104. The copy or copies of the update(s) can be stored using any suitable manner of implementation, for example a shared hard drive, memory, or cloud resource.

Consequently, in operation, once the update package generator 116 has identified the first update to be applied to the client device 104 as well as the data the functionality required in the form of the second update, these are generated and communicated 150 to the content server 140 and then communicated 152 from the content server 140 to the client device 104, in the manner already described above.

Figure 10:
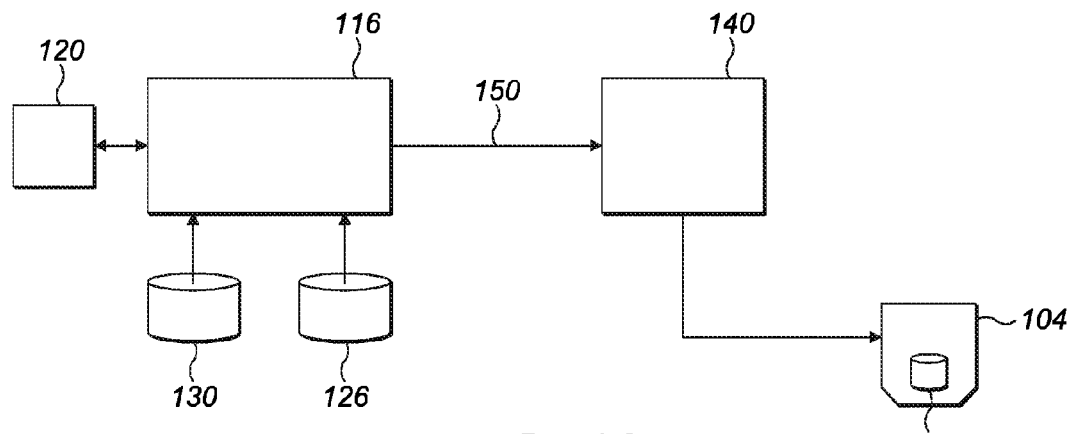
FIG. 10 is a schematic diagram of a further architecture for the system of FIG. 1 and constituting yet another embodiment of the invention.
Figure 11:
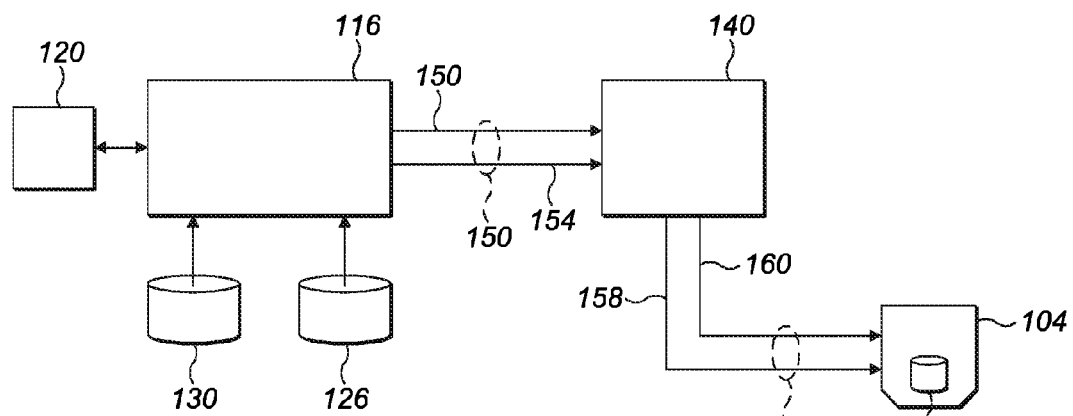
FIG. 11 is a schematic diagram of yet a further architecture for the system of FIG. 1 and constituting yet a further embodiment of the invention.

Turning to FIG. 11, the implementation of FIG. 10 will now be described in the context of the separate communication of the update package comprising the second update and the another update package comprising the first update in organised form. In this respect, once determined using any suitable implementation, for example of the kind already described above, a first separate communication 154 is used to communicate the second update and any other such functions (constituting the another update package) from the update package generator 116 to the content server 140, and a second separate communication 156 is used to store communicate the first update. The first and second separate communications 154, 156 serve the same purpose as the first combined communication 150 of FIG. 10. The update package and the another update package comprising the second update and the first update, respectively, are then communicated as a third separate communication 158 and a fourth separate communication 160 to the client device 104, which serves the same purpose as the second combined communication 152 of FIG. 10. Again, depending upon implementation needs, one or more transitory (or permanent) copies of the another update package and/or the update package can be stored for shared use by the update package generator 116 and the content server 140, and the content sever 140 and the client device 104. The copy or copies of the update(s) can be stored using any suitable manner of implementation, for example a shared hard drive, memory, or cloud resource.

This arrangement of this example is a different organisation of the communication of data as compared with the example of FIG. 10, but otherwise functions in a like manner to the previous example.

In respect of the above embodiments, it should be appreciated that the first update is free from queries that require a response from the client device 104. Likewise, the update package is free from queries that require a response from the client device 104.

The skilled person should appreciate that the above-described implementations are merely examples of the various implementations that are conceivable within the scope of the appended claims.

For example, instead of the device capability manager 126 determining necessary functionality required by the client device 104 to implement the recovery function, the update package generator 116 can determine the necessary functionality by reference to the capability data repository 128. Likewise, instead of the device capability manager 126, the update package generator 116 can compare the target functionality required of the client device 104 with the existing functionality supported by the client device 104 in order to identify the functionality deficit or differential constituting the necessary functionality required by the client device 104. The device capability manager 126 can nevertheless determine the functionality possessed by the client device or a type of client device 104 in response to a function list request message received from the update package generator 116.

Although, in the above examples, the device capability manager 126 and the capability data repository 128 are supported by the client updating server 102, the skilled person should appreciate that the device capability manager 126 need not be co-located with the client updating server 102. Likewise, the capability data repository 128 need not be co-located with the client updating server 102. In this regard, the device capability manager 126 and the capability data repository 128 can respectively be located remotely from the client updating server 102 and indeed separately from each other, for example by being supported by respective separate servers.

In the examples set forth above, the client device 104 relies upon a wireless communications interface in order to participate in an update process. However, as intimated above, wireline communications can be used to ensure connectivity of the client device 104. The skilled person should also appreciate that the non-OS software need not relate to the wireless communications capability or the wireline communications capability of the client device 104, and the non-OS software can relate to other aspects of the client device 104, for example as suggested above a GNSS receiver, such as a Global Positioning System (GPS) receiver, or an application processor, such as one provided by the manufacturer of the client device 104.

Although described as distributed in architecture, the client updating server 102 can comprise the OMADM server 146. Furthermore, the OMADM server 146 is only an example of a type of server that can be employed in some of the embodiments described above and the skilled person should appreciate that other appropriate kinds of server can be employed, for example a server supporting communications in accordance with the Open Mobile Alliance (OMA) Lightweight Machine-to-Machine (LWM2M) protocol.

The apparatus and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A software update system comprising:
a client device having non-OS system software to be updated;
a client updating server located remotely from the client device and capable of communicating with the client device; and
a device capability manager stored in a memory arranged to access technical capability data relating to the client device; wherein
the client updating server is arranged to retrieve a first update required to update at least part of the non-OS system software of the client device;
the client updating server comprises an update optimizer stored in a memory arranged to cooperate with the device capability manager to determine an organizational scheme to apply to the first update to the client device so as to optimise optimize updating of the client device, the determined organizational scheme being compatible with a technical capability of the client device, and the update optimizer is arranged to identify a recovery function to recover the first update from an instance of the first update organized in accordance with the determined organizational scheme, the identified recovery function comprising one or more steps to be performed by the client device in order to reverse an organization of the first update;
the device capability manager is arranged to use the capability data in order to determine necessary functionality required by the client device to implement the recovery function identified by the update optimizer;
the client updating server comprising an update package generator responsive to the update optimizer and arranged to generate an update package comprising a second update that enables the client device to support the recovery function;
the client updating server comprises an update communications unit arranged to communicate the update package to the client device; and
the client device is arranged to receive the update package and extract and install the second update.

2. A system as claimed in claim 1, wherein the client updating server is arranged to instruct the update communications unit to communicate the update package to the client device before the first update.

3. A system as claimed in claim 1, wherein the client updating server is arranged to instruct the update communications unit to communicate separately the update package and the instance of the first update organized in accordance with the determined organizational scheme to the client device.

4. A system as claimed in claim 1, wherein the update communications unit is arranged to send an advice to the client device to expect to receive the update package to facilitate recovery of the first update from the instance of the first update organized in accordance with the determined organizational scheme.

5. A system as claimed in claim 4, wherein the update communications unit is arranged to send the instance of the first update organized in accordance with the determined organizational scheme before the update package and the advice to the client device accompanies the instance of the first update organized in accordance with the determined organizational scheme.

6. A system as claimed in claim 1, wherein the client updating server is arranged to retrieve the first update from a repository of updates.

7. A system as claimed in claim 1, wherein the client updating server comprises a capability data repository accessible by the device capability manager, the capability data repository recording existing functionality supported by the client device.

8. A system as claimed in claim 7, wherein the device capability manager is arranged to determine the necessary functionality required by the client device to implement the recovery function by reference to the capability data repository.

9. A system as claimed in claim 8, wherein the device capability manager is arranged to compare a target functionality required of the client device with the existing functionality supported by the client device in order to identify a functionality differential constituting the necessary functionality required by the client device.

10. A system as claimed in claim 9, wherein the client updating server comprises a functionality repository, the functionality repository comprising a plurality of operating functions.

11. A system as claimed in claim 10, wherein the update package generator is arranged to access the functionality repository in order to retrieve an operating function from the functionality repository in order to provide at least part of the functionality of the functionality differential.

12. A system as claimed in claim 11, wherein the second update comprises the retrieved operating function.

13. A system as claimed in claim 1, wherein the update package generator is arranged to generate another update package comprising the first update organized in accordance with the determined organizational scheme.

14. A system as claimed in claim 1, wherein the update optimizer is arranged to identify another recovery function to be applied in combination with the recovery function to recover the first update from the instance of the first update organized in accordance with the determined organizational scheme.

15. A system as claimed in claim 1, wherein the non-OS system software is firmware.

16. A system as claimed in claim 1, wherein the client device comprises a communications module and the first update pertains to the communications module.

17. A system as claimed in claim 1, wherein the organizational scheme comprises at least one of: a compression scheme; an encryption scheme; a data differencing scheme; and a delta encoding scheme.

18. A system as claimed in claim 1, wherein the update package generator is responsive to the device capability manager by being responsive to the necessary functionality required by the client device determined by the device capability manager.

19. A system as claimed in claim 1, wherein determination by the device capability manager of the necessary functionality required is determination of functionality lacked by the client device to implement the recovery function identified by the update optimizer.

20. A system as claimed in claim 1, wherein the update optimizer is arranged to select the organizational scheme based upon one or more of the following criteria: volatile memory usage; non-volatile memory usage; size of physical blocks of memory; degree of distribution of changes associated with implementation of the first update; a size of the update package; and processing time required by the client device.

21. A system as claimed in claim 1, wherein the recovery function is a compiled code, a compiled script, an interpretable code or an interpretable script.

22. A system as claimed in claim 1, wherein the first update relates to a non-update maintenance functional aspect of the client device.

23. A system as claimed in claim 22, wherein the functional aspect is selected from the group consisting of: a method for generating random numbers, a method for calculating checksums, a method for decoding the data that follows in a subsequent update package, a method for decompressing the update package, a function of a GNSS receiver, a vocoder plug-in, a new feature, a new AT command, and a security patch.

24. A system as claimed in claim 1, wherein the client updating server is arranged to identify the first update required to update a group of client devices comprising the client device, and the update communications unit is arranged to communicate wirelessly the update package to all of the client devices of the group of client devices.

25. A system as claimed in claim 1, wherein the update package and/or the first update are/is free from queries requiring a response from the client device.

26. A system as claimed in claim 1, wherein the update package generator comprises a delta file generator.

27. A system as claimed in claim 7, wherein the update package generator is arranged to determine the necessary functionality required by the client device to implement the recovery function by reference to the capability data repository.

28. A system as claimed in claim 8, wherein the update package generator is arranged to compare a target functionality required of the client device with the existing functionality supported by the client device in order to identify a functionality differential constituting the necessary functionality required by the client device.

29. A system as claimed in claim 27, wherein the device capability manager is arranged to determine functionality possessed by the client device or a type of client device in response to receipt of a function list request message from the update package generator.

30. A system as claimed in claim 1, wherein the client updating server comprises an Open Mobile Alliance Data Management (OMADM) server and a capability data repository accessible by the OMADM server, the capability data repository recording existing functionality supported by the client device.

31. A system as claimed in claim 30, wherein the OMADM server is arranged to determine functionality possessed by the client device or a type of client device in response to receipt of a function list request message from the update package generator.

32. A system as claimed in claim 30, wherein the device capability manager is arranged to receive a function list request message and in response thereto send the function list request to the OMADM server, the OMADM server being arranged to determine functionality possessed by the client device or a type of client device in response to receipt of the function list request message from the device capability manager.

33. A system as claimed in claim 1, wherein the update package is communicated to the client device in accordance with a data structure definition, the data structure definition comprising:
a required functionality content field reserved to contain the update package.

34. A system as claimed in claim 32, wherein the data structure definition further comprises: an update content field reserved to contain the instance of the first update organized in accordance with the determined organizational scheme.

35. A system as claimed in claim 33, wherein the data structure definition further comprises: a function indicator field reserved to contain an identifier of a function associated with recovering the instance of the first update organized in accordance with the determined organizational scheme; and the function indicator field is arranged to accompany the required functionality content field.

36. A system as claimed in claim 35, wherein the data structure definition further comprises: another required functionality content field reserved to contain the another update package.

37. A system as claimed in claim 36, wherein the data structure definition further comprises: another update content field reserved to contain an instance of another organized update.

38. A system as claimed in claim 37, wherein the data structure definition further comprises: another function indicator field reserved to contain another identifier of another function associated with recovering the instance of the another organized update; and the another function indicator field is arranged to accompany the another required functionality content field.

39. A system as claimed in claim 1, wherein a firmware over the air updating system comprises the software update system.

40. A method of updating a client device having non-OS system software to be updated, the method comprising:
accessing capability data relating to the client device;
retrieve a first update required to update at least part of the non-OS system software of the client device;
determining an organizational scheme to apply to the first update to the client device so as to optimize updating of the client device, the determined organizational scheme being compatible with a technical capability of the client device;
identifying a recovery function to recover the first update from an instance of the first update organized in accordance with the determined organizational scheme, the identified recovery function comprising one or more steps to be performed by the client device in order to reverse an organization of the first update;
using the capability data in order to determine necessary functionality required by the client device to implement the recovery function identified by the update optimizer;
generating an update package in response to the determination of the necessary functionality required by the client device, the update package comprising a second update that enables the client device to support the recovery function;

communicating the update package to the client device; and the client device receiving the update package and extracting and installing the second update.

\* \* \* \* \*